Oct. 26, 1965     C. W. FITZGERALD     3,213,703
SHAFT ASSEMBLY
Original Filed Sept. 20, 1961
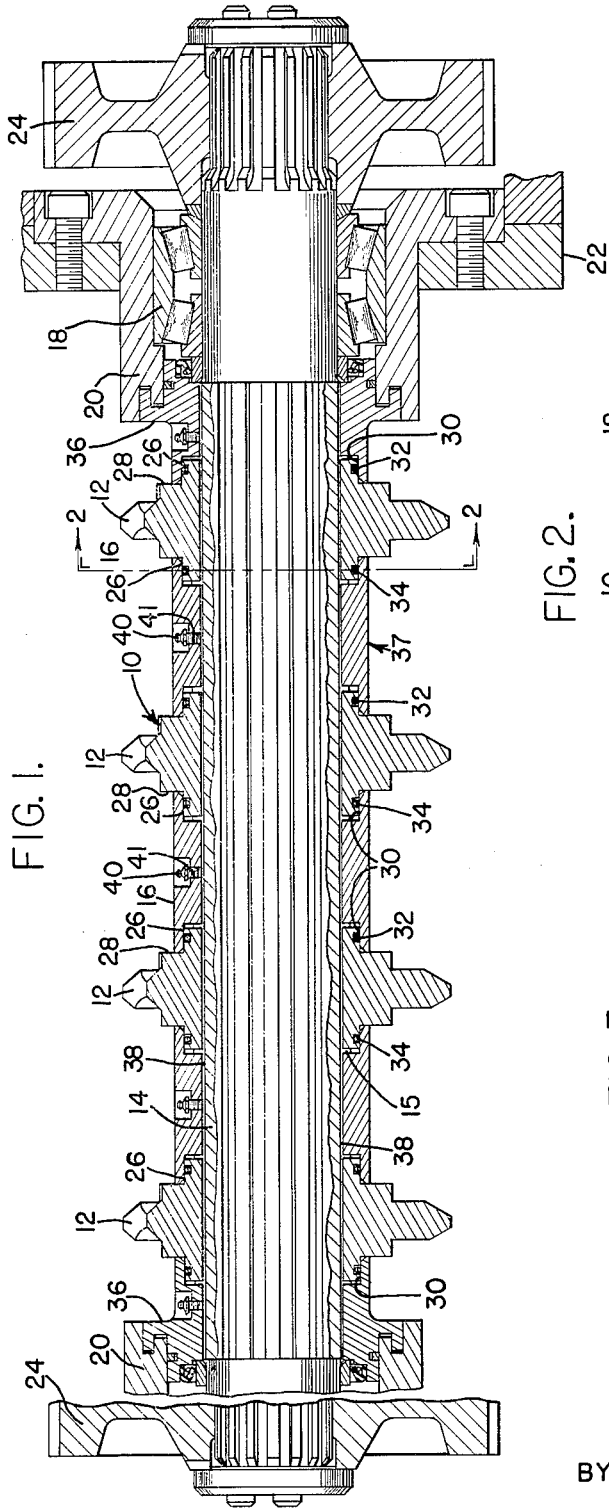
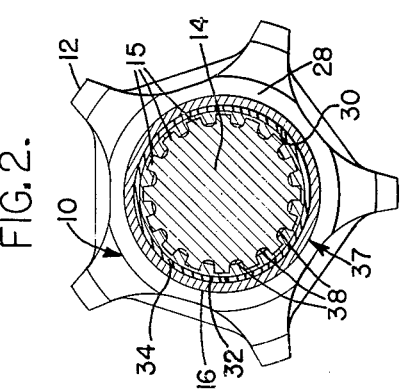
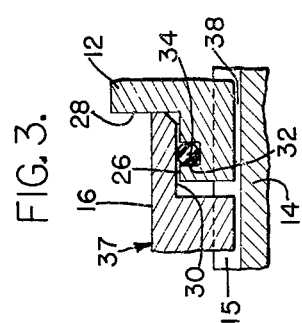
INVENTOR:
CHARLES W. FITZGERALD
BY *E. Wallace Breisch*
ATTORNEY

3,213,703
SHAFT ASSEMBLY
Charles W. Fitzgerald, Franklin, Pa., assignor to Joy Manufacturing Company, Pittsburgh, Pa., a corporation of Pennsylvania
Continuation of application Ser. No. 139,475, Sept. 20, 1961. This application Oct. 15, 1964, Ser. No. 408,451
10 Claims. (Cl. 74—432)

This application is a continuation of my application Serial No. 139,475, filed September 20, 1961, now abandoned.

This invention relates to a shaft assembly and more particularly to a shaft assembly having a plurality of spaced drive or driven members mounted thereon with sealing devices mounted between adjacent members to provide for proper lubrication of the assembly.

In prior shaft assemblies such as those having multiple sprockets it has been the general practice to employ a plurality of internally splined sprockets mounted on an externally splined shaft which rotatively, drivingly, supports the sprockets to cause orbital movement of a set of chains trained about two complete sets of such sprockets, a set of drive sprockets and a set of idler sprockets, respectively. Such multiple sprocket sets are used for conveying and loading, however, this invention is particularly applicable to cutter chain drive and idler sprocket sets as applied on a ripper type continuous miner such as that shown and described in the U.S. Patent 2,908,374. It has further been the general practice to provide for suitable axial spacing of such sprockets by the use of axially extended, internally splined, hub portions of such sprockets abuttingly engaged with similar hub portions of the adjacent sprockets. Such sprocket sets have generally been employed with no provision for lubrication of the spline surfaces within the sprockets which are in abutting contact with the external spline of the shaft. Although such devices have served the purpose, they have not proved entirely satisfactory under all conditions of service for the reason that the splines wear out too rapidly to be consistent with the economical operation of the device.

It has been found that, because of the manufacturing operations and assembly techniques applied to such multi-sprocket devices, a significant amount of clearance must be maintained between the internal splines of the sprockets and the external splines of the shaft. Such clearance obviously allows relative motion to take place between the internal and external splines during operation of the device, which splines, being unlubricated, are subject to rapid wear. Another difficulty associated with the aforesaid spline clearance arises from the fact that such multi-sprocket devices are often used in an atmosphere heavily loaded with rock or coal dust, so that highly abrasive dust particles enter into the aforementioned spline clearance and cause extremely rapid wearing of the splines.

A multiple sprocket device constructed in accordance with the present invention provides spacers between the sprockets which, together with seals between the sprockets and spacers, transform the aforementioned spline clearances, within the sprockets, into closed spaces continuous throughout the length of the splined portion of the shaft. Such spacers are provided with lubrication fittings by which the closed spaces can be filled with lubricant to reduce the wear normally present between the splined surfaces. Such sealing also effectively excludes abrasive material from the spline clearances and thus further reduces the rate of wear of the spline surfaces.

It is therefore an object of this invention to provide a shaft assembly having a multiplicity of sprockets in driving or driven relationship with a drive shaft on an idler shaft.

It is a further object of this invention to provide a shaft assembly having lubricant sealing means between individual sprockets of a multiple sprocket apparatus.

It is a more specific object of this invention to provide a shaft assembly comprising spacers and seals between individual sprockets, of a sprocket set, mounted on a splined shaft, whereby lubrication supplied to the shaft through the spacers may be effectively retained upon the shaft and within the sprockets.

It is a further specific object of this invention to provide a shaft assembly having spacers and seals between the individual sprockets of a multiple sprocket apparatus wherein continuous spline clearance spaces formed between internal splines of the sprockets and external splines or a shaft, common to all the sprockets, will be effectively sealed from the surrounding atmosphere.

These and other objects and advantages of this invention will become more fully apparent upon consideration of the following description and drawings, in which:

FIG. 1 is a fragmentary axial section through a shaft assembly having multiple sprockets constructed in accordance with the principles of this invention;

FIG. 2 is a sectional view taken on line 2—2 of FIG. 1;

FIG. 3 is an enlarged fragmentary view of a portion of FIG. 1.

In FIG. 1 there is shown a shaft assembly 10, constructed in accordance with the principles of this invention which assembly 10 comprises a plurality of externally toothed, internally splined, hub members or sprockets 12 mounted upon and drivingly associated with an elongated externally splined generally cylindrical shaft 14. The sprockets 12 are axially spaced apart by, and overlappingly engaged with, a plurality of hollow cylindrical internally splined spacing members 16. The shaft 14 is rotatably journaled in suitable anti-friction bearings 18 suitably received in hollow cylindrical bearing carriers 20 rigidly secured in the end portions of a suitable fork type mounting frame 22. It is to be noted that only one of the bearings 18, the bearing carriers 20, and the end portions 22, is shown because of the fragmentary nature of FIG. 1 which omits these details from the left hand end of the drawing. The shaft 14 is also provided with a main splined portion 15 extending from an unsplined portion forming a bearing seat near one end of the shaft 14 to a similar unsplined portion near the other end. The main splined portion 15 is suitably received by the internal splines of the sprockets 12 and the spacers 16 with a necessary clearance space 38 produced by making the minor diameter of the internal splines greater than the minor diameter of the main splined portion 15 in the conventional manufacturing operation. It is to be appreciated that although a particular number of splines, sixteen, is shown in the drawing of the main splined portion 15 any number of splines such as fourteen or eighteen or more or less can be used without departing from the principles of this invention, Rigidly secured to splined outer end portions of the shaft 14, and rotatable in splined relationship therewith, is a pair of suitable internally splined drive gears 24 suitably driven by a suitable transmission (not shown) provided with power from an electric motor or other source of mechanical energy.

Each sprocket 12 has two reduced diameter end portions 26, at axially opposite ends thereof, respectively, forming two annular shoulder portions 28, on oposite sides of the sprocket, which are abuttingly engaged with the end surfaces of the spacer members 16. The reduced diameter end portions 26 are overlappingly engaged with axial counterbores 30 formed in both ends of each of the spacing members 16. A peripheral groove 32 spaced axially inwardly from the end of each reduced diameter end portion 26 is formed in each portion 26 and receives a resilient circular sealing element 34, such as an O-ring, which is held in a compressed state in engagement with the peripheral groove 32 and the axial counterbore 30. The element 34 provides a seal against lubricant leakage outwardly from the splines and air or water leakage inwardly from the surrounding atmosphere. It is to be noted that each pair of sprockets 12 is spaced apart but connected, in oil tight communication, by a spacing element 16 and a pair of sealing elements 34. The outer end portion 26 of each of the outermost sprockets 12 is similarly overlappingly engaged by an axial counterbore 30 of an internally splined end spacing member 36, the inner end surface of which is abuttingly engaged with the shoulder portion 28 of the outermost sprocket 12. The outer end of the end spacing member 36 is rotatably received by the bearing carrier 20 and is provided with a labyrinth and oil seals in a conventional manner to retain gear oil furnished to the anti-friction bearing 18 from the transmission hereinbefore mentioned.

It is to be noted that the spacing elements 16 and 36 together with the sprockets 12 form a continuous, internally splined cover means 37, rotating as a unit with the shaft 14 and extending from one end to the other of the main splined portion 15 of the shaft 14. Since the minor diameters of the internally splined sprockets 12 and spacing members 16 and 36 are somewhat greater than the minor diameter of the externally splined main splined portion 15 of the shaft 14, there is formed a continuous space 38 extending from one end of the main splined portion 15 to the other end thereof. Each of the spacers 16 and 36 is provided with a conventional lube fitting 40 threadedly engaged in a threaded radial bore 41, to provide for introducing lubricant into the continuous space 38 at axially spaced points along the periphery of the continuous cover means 37.

It is to be further noted that the internal splines in the spacing members 16 can be omitted with the advantage of reduced cost and increased lubricant storage without departing from the lubricant retaining and air excluding principles of this invention. When the splines are omitted each spacing member 16 will be provided with an axial bore having a diameter substantially equal to the major diameter of the external splines 15.

It is to be appreciated that pressure applied to a lubricant by a conventional pressurized lube gun operatively attached to the lube fitting 40 will force the lubricant through the space 38 and into many other spaces between the splines which communicate with the continuous space 38 thus filling all available empty spaces within the continuous covering 37 and obviating the possibility of abrasive substances or water from the surrounding atmosphere being introduced into these spaces.

The advantages inherent in the multiple sprocket apparatus 10 of this invention are the result of providing lubrication on the wear surfaces of the spline and the exclusion of abrasive substances and water therefrom. These advantages include increased useful life of the sprockets and shaft, smoother operation for longer periods of time because original fit is maintained for a greater period of time, and consequent reduced maintenance cost for the apparatus.

A preferred embodiment of this invention having been described, it is to be realized that modifications thereof may be made without departing from the broad spirit and scope of this invention. Accordingly, it is respectfully requested that this invention be interpreted as broadly as possible and be limited only by the prior art.

What is claimed is:

1. A shaft assembly comprising, an elongated externally splined shaft, a plurality of internally splined hub members spaced longitudinally on said shaft for rotation therewith, internally splined spacer members on said shaft and rotatable therewith, said spacer members extending axially of said shaft between adjacent hub members respectively, and each of said hub members having means thereon engageable with the said spacer members adjacent thereto for providing a seal therebetween, respectively.

2. A shaft assembly as defined in claim 1 in which the minor diameters of the splines on said shaft are radially spaced from the minor diameters of the splines on all of said hub and spacer members and at least one of said spacer members having means for lubricating said shaft.

3. A shaft assembly comprising, an elongated externally splined shaft, a plurality of internally splined first members spaced longitudinally on said shaft for rotation therewith, each axially spaced end portion of each of said first members having an integral portion extending axially outwardly therefrom, internally splined spacer members on said shaft and rotatable therewith, said spacer members extending axially of said shaft between adjacent ones of said first members, with the opposite ends thereof located adjacent axially adjacent ones of said integral portions, respectively, and each of said integral portions having means thereon to provide a seal between said each integral portion and the end of said spacer member adjacent thereto.

4. A shaft assembly as defined in claim 3 in which the minor diameters of the splines on said shaft are radially spaced from the minor diameters of the splines on all of said hub and spacer members and at least one of said spacer members having means for lubricating said shaft.

5. A machine comprising, a frame having spaced portions, an elongated splined shaft extending between said spaced portions and rotatively supported thereby, a plurality of internally splined hub members spaced longitudinally on said shaft for rotation therewith, internally splined spacer members on said shaft and rotatable therewith, said spacer members extending axially of said shaft between adjacent hub members, respectively, each of said hub members having means thereon engageable with the said spacer members adjacent thereto for providing a seal therebetween respectively and means carried by said shaft outwardly adjacent the outermost ones of said hub members respectively which cooperates with said spaced portions and said outermost hub members to provide a seal between said means said spaced portions and said outermost hub members.

6. A shaft assembly comprising, an elongated externally splined shaft, a plurality of internally splined first members spaced lonigtudinally on said shaft for rotation therewith, each axially spaced end portion of each of said first members having an integral portion extending axially outwardly therefrom, internally splined tubular spacer members on said shaft and rotatable therewith, said spacer members extending axially of said shaft between adjacent ones of said first members respectively with the opposite ends thereof overlying axially adjacent ones of said integral portions, and means engaging said opposite ends of said spacer members and said integral portions respectively to provide a seal therebetween.

7. A shaft assembly as defined in claim 6 in which internally splined second members are spaced on said shaft axially outwardly adjacent the outermost ones of said first members and means engaging said second members and said outermost ones of said first members to provide a seal therebetween.

8. A shaft assembly comprising, an elongated externally splined shaft, a plurality of internally splined hub members spaced longitudinally on said shaft for rotation therewith, tubular spacer members mounted on said shaft, said spacer members extending axially of said between adjacent hub members respectively, and each of said hub members having means thereon engageable with the said spacer members adjacent thereto for providing a seal therebetween, respectively.

9. A shaft assembly comprising, an elongated externally splined shaft, a plurality of internally splined hub members spaced longitudinally on said shaft for rotation therewith, axially bored spacer members extending axially of said shaft between adjacent hub members respectively, and each of said hub members having means thereon engageable with the said spacer members adjacent thereto for providing a seal therebetween respectively.

10. A shaft assembly as defined in claim 9 in which the minor diameters of the splines on said shaft are radially spaced from the minor diameters of the splines on all of said hub members and at least one of said spacer members having means for lubricating said shaft.

No references cited.

DON A. WAITE, *Primary Examiner.*